United States Patent [19]

Meche et al.

[11] Patent Number: 5,161,249
[45] Date of Patent: Nov. 3, 1992

[54] SECTORED VOICE CHANNELS WITH REAR LOBE PROTECTION

[75] Inventors: Paul S. Meche, Richardson; Donald V. Hanley, Garland; Eugenie M. Chaplain, Plano, all of Tex.

[73] Assignee: Northern Telecom Limited, Montreal, Canada

[21] Appl. No.: 794,636

[22] Filed: Nov. 18, 1991

Related U.S. Application Data

[63] Continuation of Ser. No. 452,510, Dec. 19, 1989, abandoned.

[51] Int. Cl.$^5$ .................. H04Q 7/00; H04B 15/00
[52] U.S. Cl. .................. 455/33.3; 455/56.1; 455/62; 455/67.3; 379/60
[58] Field of Search .................. 455/32-34, 455/56, 62, 67, 63, 53, 54, 33.1, 33.3, 33.4, 161.2; 379/60

[56] References Cited
U.S. PATENT DOCUMENTS
4,723,266 2/1988 Perry .................. 455/33

Primary Examiner—Reinhard J. Eisenzopf
Assistant Examiner—Andrew Faile
Attorney, Agent, or Firm—Foley & Lardner

[57] ABSTRACT

An improved method of initiating handoffs between sectors so as to reduce sectored voice channel interference is disclosed. The sectors that are adjacent and to the rear of the sector that is serving the mobile unit are scanned for signal quality. A handoff request message is sent to the cell controller if the signal quality detected by any of the scanned sectors is better than the signal quality read at the sector serving the mobile unit. When the handoff request message is received at the cell controller, a voice channel is allocated to the cell and sector associated with the scanned sector specified as having the better signal. A handoff process from the voice channel currently serving the mobile unit to the newly allocated voice channel in the specified sector, is then initiated.

7 Claims, 5 Drawing Sheets

SECTORED VOICE CHANNELS WITH REAR LOBE PROTECTION

This application is a continuation of application Ser. No. 07/452,510, filed Dec. 19, 1989 abandoned.

FIELD OF THE INVENTION

This invention relates to mobile cellular systems and more particularly to an improved method of handing off between sectors of the same cell.

BACKGROUND OF THE INVENTION

A mobile cellular system is composed of a number of cells where each cell commonly contains a number of base stations sharing a single antenna complex. In an OMNI configuration, the antenna complex of a cell consists of one transmit antenna complex and two receive antennas for space diversity. In this arrangement, the voice channel base station will have both of its receivers tuned to the same frequency. The receiver detecting the better quality radio signal from the mobile unit will be selected while the second receiver provides the diversity function. As the mobile moves out of its current serving cell, the radio signal will begin to degrade. When the signal reaches a predetermined level, the voice channel will inform the cell controller. The cell controller will locate another cell in the system by soliciting locating receiver measurements from the serving cell and from all cells adjacent to the serving cell. If the serving cell reports the best quality signal, the call will remain in this cell on the same voice channel. If one of the cells adjacent to the serving cell reports the best quality signal, the cell controller will transfer the mobile call to a voice channel in this new cell. This technique is commonly referred to as cell handoff. In many sectored implementations, the antenna complex consists of one directional transmit antenna and two directional receive antennas for space diversity in each sector. A cell can contain anywhere from two to six of these sectors. A voice channel on this cell would have both of its receivers connected to the two receive antennas associated with the sector on which it resides. A handoff between sectors can be initiated according to the algorithm described above (i.e a drop in signal quality below some predetermined threshold which is then verified by locating receiver measurements) since the directional antennas of the serving sector form an RF pattern that drops off and overlap the sectors adjacent to it. A handoff between sectors can also be initiated when the signal quality received by the voice channel from the mobile unit degrades by some delta value rather than below an absolute threshold. Locating receiver measurements would then be taken in the serving sector and in the rest of the sectors of this cell to ensure that the mobile unit is served by the sector having the best signal.

One problem associated with the techniques described above is that they require a great deal of messaging and CPU usage to take the additional locating receiver measurements to determine the target cell or sector.

Another problem associated with the handoff techniques currently being used, is the existence of interference when the mobile unit travels through the center of the cell and then to the rear sector. In the rear sector, the RF propagation patterns of the serving sector will allow the mobile to continue to be served by the same voice channel without signal degradation and thus without handoff initiation. The signal from this voice channel is now closer to the voice channel in another cell which uses the same frequency and to those voice channels in other cells which use frequencies adjacent this frequency. If another mobile is being served by this voice channel on the same frequency, co-channel interference occurs. If another mobile is being served by one of these voice channels on a frequency adjacent to this frequency, adjacent channel interference occurs.

SUMMARY OF THE INVENTION

It is therefore an object of the invention to provide an improved method for initiating handoffs between sectors, which does not rely on a drop in signal quality in the sector being served.

Another object of the present invention is to provide a method of reducing sectored voice channel interference.

According to an aspect of the invention, there is provided an improved method of initiating handoffs between sectors so as to reduce sectored voice channel interference, comprising the steps of:

a) scanning at least the sectors that are adjacent and to the rear of the sector that is serving the mobile unit;

b) sending a handoff request message to the cell controller if the signal quality detected by any of said scanned sectors is better than the signal quality read at said sector serving said mobile unit;

c) receiving a handoff request message at a cell controller;

d) allocating a voice channel on the cell and sector associated with the scanned sector specified as having the better signal; and e) initiating a handoff process from the voice channel currently serving said mobile unit to the newly allocated voice channel in said specified sector.

BRIEF DESCRIPTION OF THE DRAWINGS

Referring now to FIG. 1 we have shown an illustrative diagram showing a cell 10 forming part of a cellular telephone network. The cells shown in the drawings are represented by the use of circles rather than the familiar octagon. In a typical cell using 60 degree sectorization, the base station is provided with two receivers that are connected to the directional receive antennas that form the sector on which the base station is datafilled. If this base station were serving a mobile, one of its receivers would be locked onto the mobile while the other receiver would be used for diversity. With this configuration, a mobile unit 11 can drive through the center of cell 10 without being identified as needing a handoff because of the rear lobe produced by a typical directional antenna RF pattern (refer to FIG. 2). If the mobile unit 11 drives through the center of the cell to a rear sector, without handing off, it would cause interference in adjoining cells.

As shown in FIG. 2, receiver diversity can be achieved using the proposed algorithm through the use of a receiver which is not serving the mobile because of the overlap in RF patterns of the directional antennas.

In this form of sectorization, the antenna complex consists of one directional transmit antenna and one directional receive antenna in each sector A voice channel antenna scanning algorithm is used at the base station to determine when a handoff between sectors is required. A voice channel on this cell would have one of its receivers connected to every other receive antenna port. In FIGS. 1 and 2, receiver A of a voice channel would be connected to antenna ports A1, A2, and A3 while receiver B would be connected to antenna ports B4, B5, and B6. When a mobile is being served by receiver A in sector A1, receiver B scans sectors B4, B5, and B6 for signal quality readings. If any of the signal quality readings reported by receiver B is better than that reported by receiver A, by a predetermined delta value, the voice channel will proceed to inform the cell controller. This message will contain the sector which detected the better signal. The cell controller will then proceed to handoff the call to a voice channel on the specified sector. If the call is handed off to a voice channel in sector B4, receiver B will lock onto the mobile while receiver A scans antenna ports A1, A2, and A3 for signal quality readings. This antenna scanning method can be extended to work with anywhere from two to six receivers available in the base station as long as at least the two sectors adjacent to and the sector to the rear of the sector serving the mobile is being scanned for signal quality readings. This method allows both rear lobe protection and diversity from the overlap in the RF coverage patterns of the adjacent sectors.

FIG. 3 shows the antenna scanning algorithm used with the present invention. The algorithm is designed to reduce channel interference by detecting handoff conditions between sectors quickly and accurately. Depending on the configuration of the base station, a voice channel in sectored mode will be connected to all six of its antenna ports with anywhere from two to six receivers.

In operation, when serving a mobile unit, the voice channel will lock onto the mobile unit using one of these antenna ports and one receiver. At the same time, the voice channel will scan the other antenna ports with the remaining receivers. If any of the antenna ports being scanned registers a signal from the mobile unit being served that is of a better quality than that of the serving antenna port, by a delta value downloaded to the voice channel, the voice channel will inform the cell controller in the form of a handoff request message. This message will contain an indication of the signal quality detected by this antenna port and the antenna port number which detected the signal.

Figure 1:
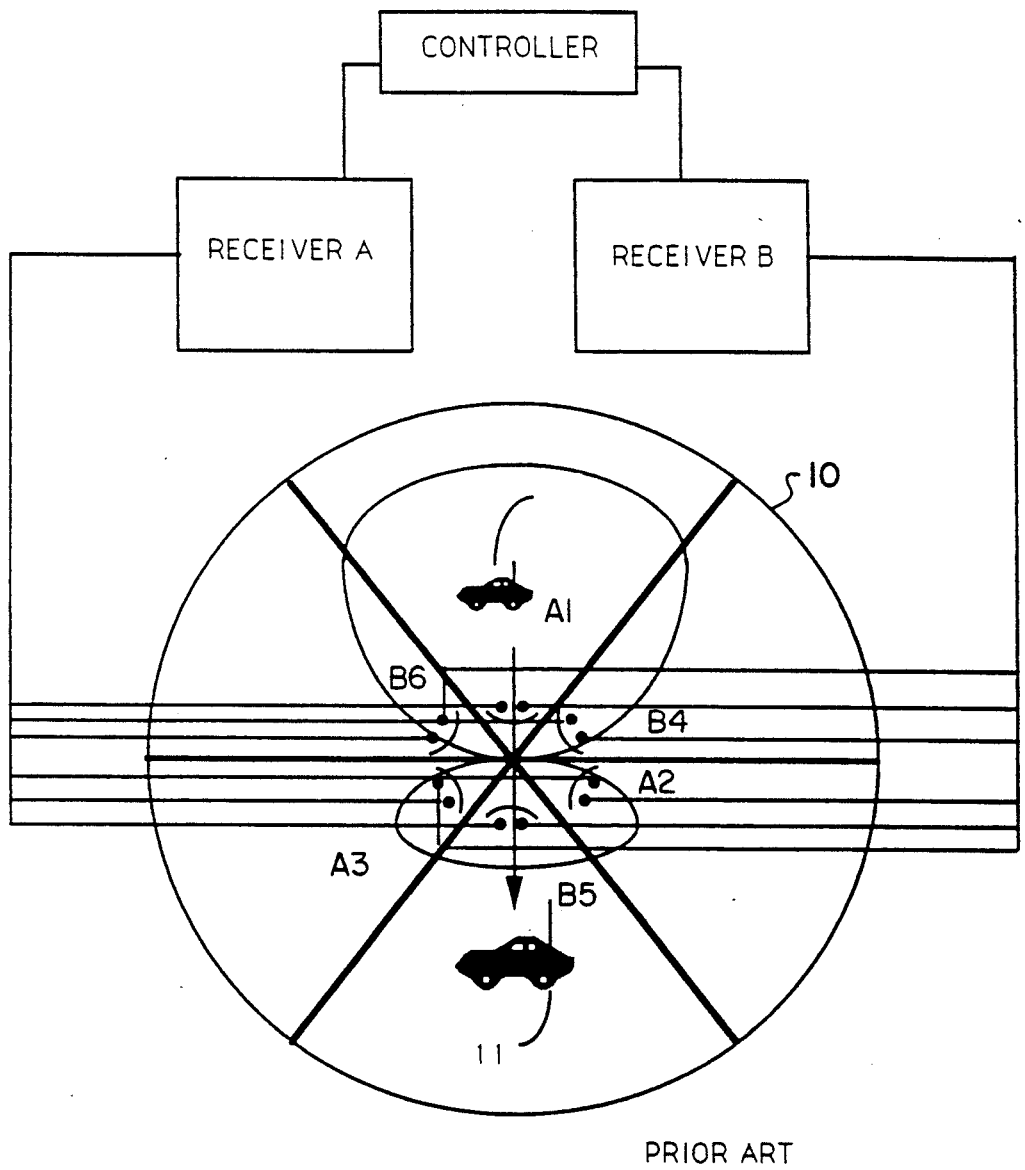
FIG. 1 is an illustrative view of a cell with 60 degree sectorization.
Figure 2:
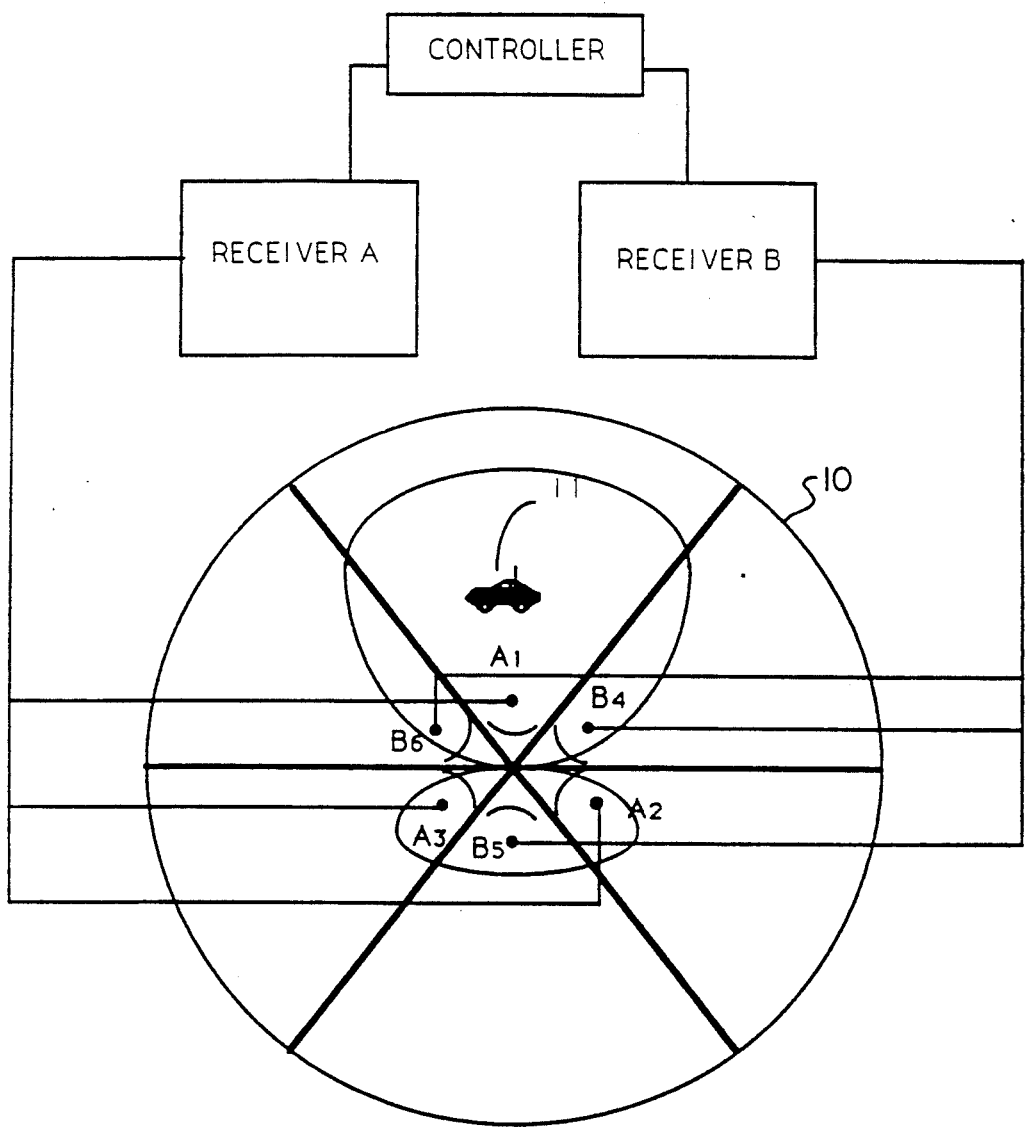
FIG. 2 shows the approximate RF coverage area of a single directional antenna for the embodiment of FIG. 1.
Figure 3:
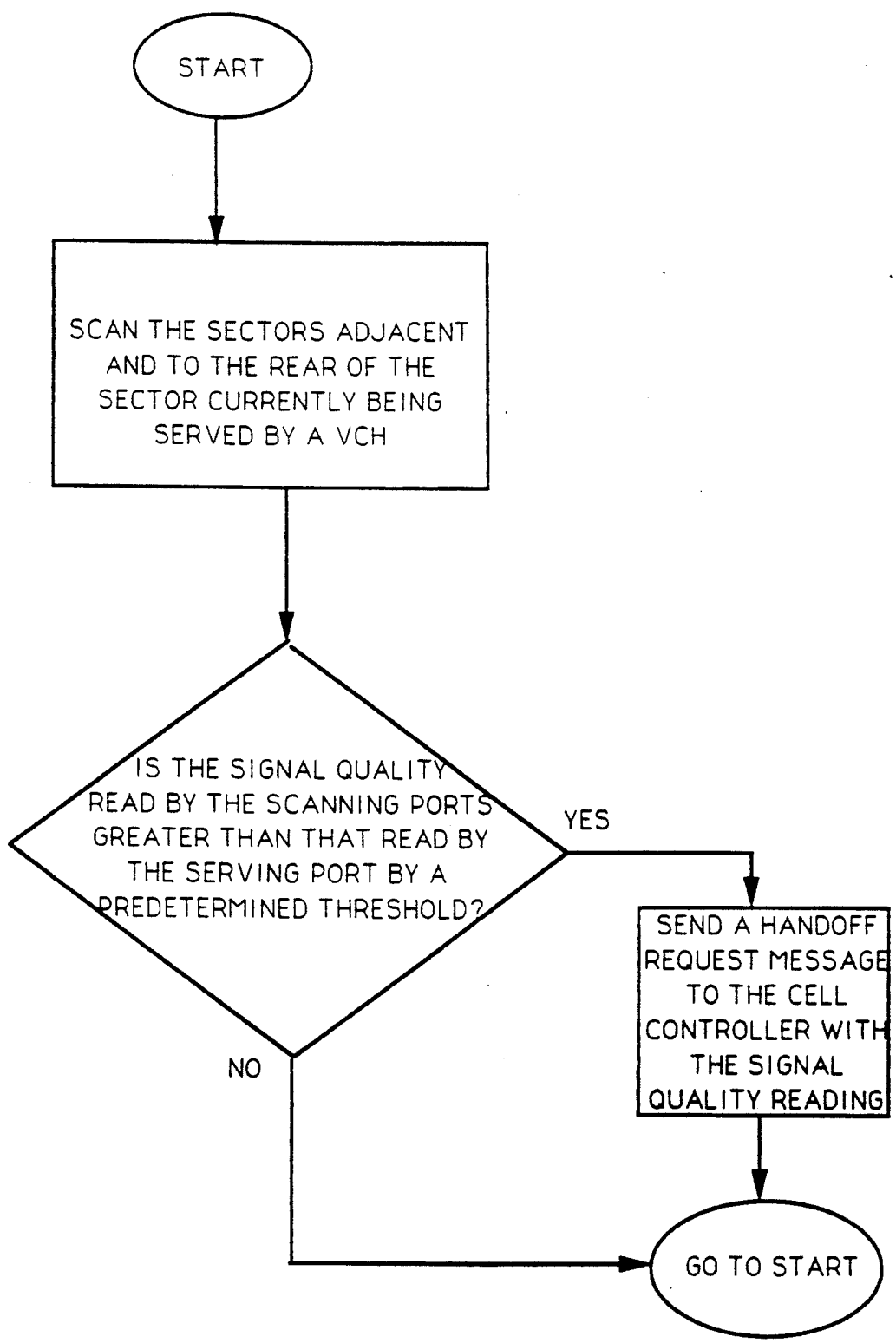
FIG. 3 is a flowchart of the antenna scanning algorithm used by voice channels in 60 degree sectorization mode.
Figure 4:
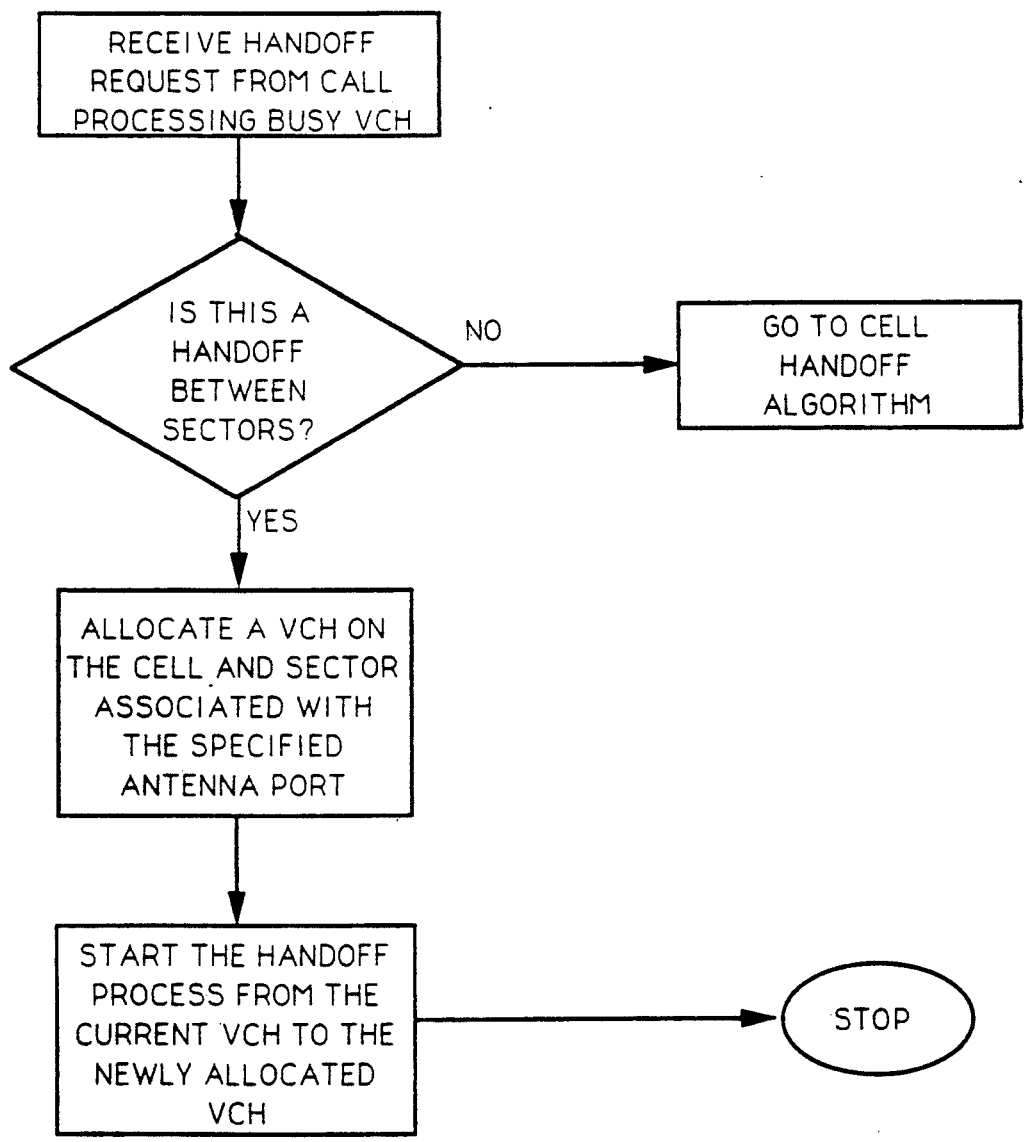
FIG. 4 is a flowchart of the cell controller algorithm used for 60 degree sectorization.

As shown by the algorithm flowchart of FIG. 4, the cell controller will allocate a voice channel on the cell and sector associated with an antenna port specified as having the better signal. The cell controller will then proceed to handoff the mobile unit to a voice channel on the specified sector. This algorithm is valid regardless of the method used in determining the quality of the signal or how diversity is obtained. Some of the methods available to determine signal quality include RSSI measurements, bit error combination of these methods.

Figures 5A, 5B:
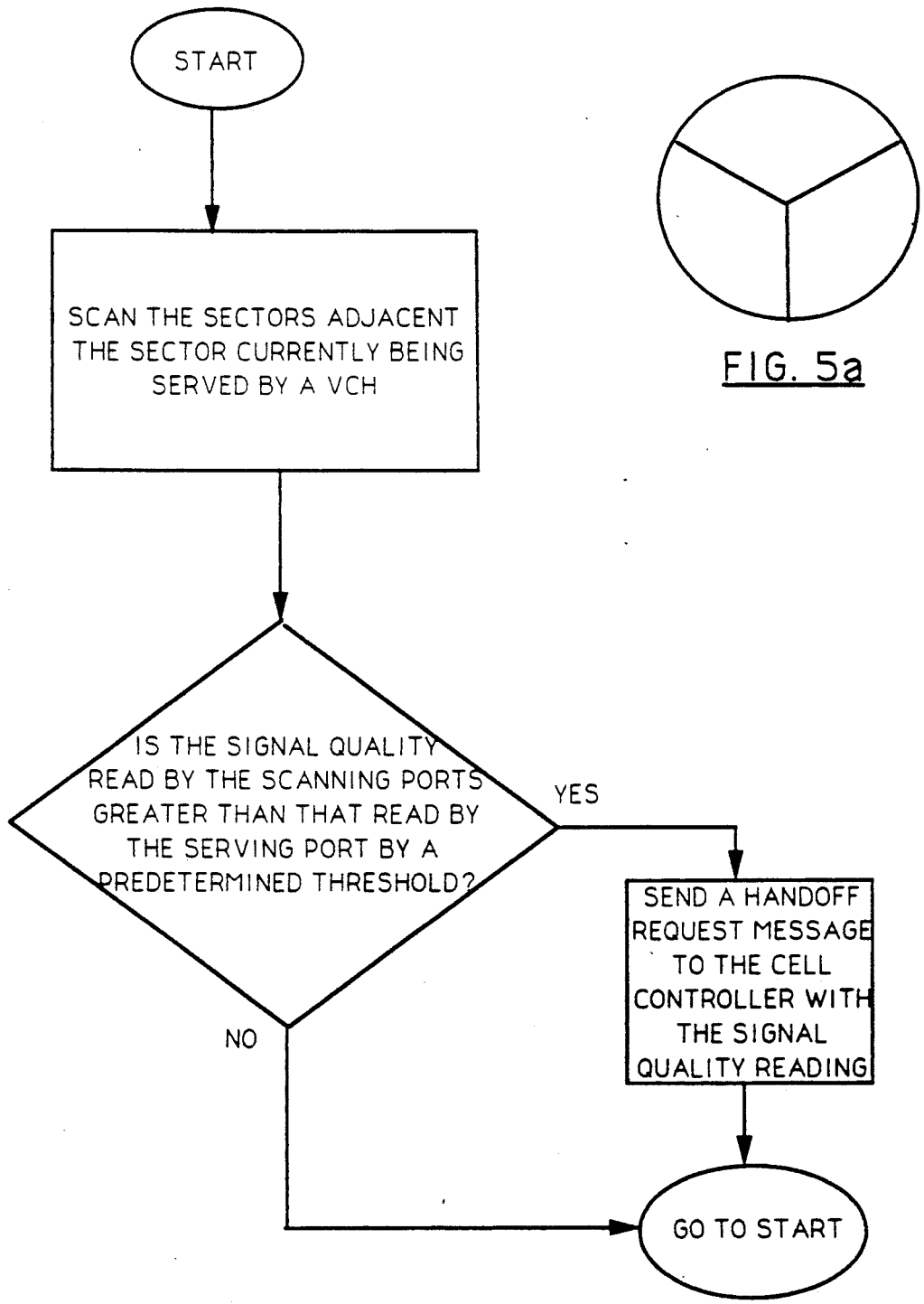
FIG. 5a is an illustrative view of a cell with 120 degree sectorization.
FIG. 5b is a flowchart of the antenna scanning algorithm used by voice channels in 120 degree sectorization mode.

FIG. 5a is an illustration of a cell using 120 degree sectorization. The antenna scanning algorithm for this arrangement is shown in FIG. 5b. In this arrangement, a first receiver will be used to serve the antenna port of the sector where the mobile unit is located, while the other receivers scan the sectors adjacent to the serving sector and report to the cell controller if the signal quality is better than that read by the serving receiver.

What is claimed is:

1. A method of reducing sectored voice channel interference when a mobile telephone user moves from a serving sector of a cell to a sector adjacent or to the rear thereof, the method comprising the steps of:
   a) positioning a first set of antennas in a first set of sectors of the cell;
   b) connecting each antenna of said first set to a first receiver;
   c) positioning a second set of antennas in a second set of sectors, said second set of sectors comprising sectors adjacent and in between the sectors of said first set;
   d) connecting each antenna of said second set to a second receiver;
   e) continuously scanning at least the sectors adjacent and to the rear of said serving sector as the mobile moves from the serving sector to another sector;
   f) sending a handoff request message to a cell controller if the signal quality detected from a receiver connected to a non-serving sector exceeds the signal quality read by a receiver connected to said serving sector;
   g) receiving the handoff request at the cell controller;
   h) allocating a voice channel on the scanned sector having the better signal quality; and
   i) initiating a handoff process such that the mobile telephone user can e served by a voice channel on said receiver connected to said non-serving sector.

2. A system for reducing sectored voice channel interference when a mobile telephone user moves from a serving sector of a cell to a sector adjacent or to the rear thereof, said system comprising:
   a) a first set of antennas positioned in a first set of sectors of the cell, each antenna of said first set being connected to a first receiver;
   b) a second set of antennas positioned in a second set of sectors comprising sectors adjacent and in between the sectors of said first set, each antenna of said second set being connected to a second receiver;
   c) means for continuously scanning at least the sectors adjacent and to the rear of said serving sector as the mobile moves from the serving sector to another sector;
   d) means for sending a handoff request message to a cell controller when the signal quality detected from a receiver connected to non-serving sector exceeds the signal quality read by a receiver connected to said serving sector;
   e) means for allocating a voice channel on the scanned sector having the better signal quality; and
   i) means for initiating a handoff process such that the mobile telephone user can be served by a voice channel on said connected to said non-serving sector.

3. A mobile communications base station serving a communications cell divided into a plurality of sectors comprising:

at least one directional receive antenna;

separate receive antenna ports for providing a separate signal from each sector within the communications cell, the sectors being grouped into at least a first sector group and a second sector group, each of the sectors of the first sector group covering an area adjacent to and between sectors of the second sector groups;

a plurality of allocatable voice channels connectable to said receive antenna ports;

at least two receivers, a first of the receivers being connected to antenna ports corresponding to the first sector group and a second receiver being connected to antenna ports corresponding to the second sector group, wherein one receiver is selectable by an active voice channel to service communication with a mobile unit in a sector corresponding to a receive antenna port providing a highest signal quality for said active voice channel and wherein remaining receivers are selectable to scan other said antenna ports for signal quality of said active voice channel;

a cell controller dynamically responsive to said active voice channel to hand off a mobile unit from a voice channel corresponding to a first sector to a voice channel corresponding to another sector having a higher signal quality.

4. The method recited in claim 3 wherein said first receiver receives signals from the mobile unit in said sector that is servicing the mobile unit and said second receiver scans a plurality of sectors including at least said sectors adjacent to and to the rear of the sector servicing the mobile.

5. The method recited in claim 4, wherein a cell has an even number of generally triangular shaped sectors having a common intersection point and wherein the first and second receivers respond to signals in alternate sectors.

6. The method recited in claim 3 wherein one of a plurality of receivers receives signals from the mobile unit in said sector servicing the mobile unit and remaining receivers scan a plurality of sectors including a t least sectors adjacent to and to the rear of the sector that is servicing the mobile unit.

7. The apparatus recited in claim 3 wherein said remaining receivers are selectable to scan at least two sectors, one being adjacent to said sector servicing the mobile and the other sector being to the rear of said sector servicing the mobile.

* * * * *